(12) United States Patent
Kanai (10) Patent No.: US 8,174,622 B2
(45) Date of Patent: May 8, 2012

(54) DATA PROCESSING METHOD AND DATA PROCESSING DEVICE FOR HISTOGRAM-BASED NONLINEAR CONVERSION

(75) Inventor: Izumi Kanai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1408 days.

(21) Appl. No.: 11/531,575

(22) Filed: Sep. 13, 2006

(65) Prior Publication Data

US 2007/0076949 A1 Apr. 5, 2007

(30) Foreign Application Priority Data

Sep. 30, 2005 (JP) ................................. 2005-287774

(51) Int. Cl.
*H04N 5/14* (2006.01)
*H04N 5/202* (2006.01)
(52) U.S. Cl. ........................................ 348/672; 348/674
(58) Field of Classification Search .................. 348/254, 348/255, 671, 672, 674–677; 382/167, 168, 382/274; 358/3.01, 3.21, 3.23; 345/589, 345/63, 77
See application file for complete search history.

(56) References Cited

U.S. PATENT DOCUMENTS

| | | | |
|---|---|---|---|
| 7,573,533 B2 | 8/2009 | Moldvai | |
| 2003/0174886 A1* | 9/2003 | Iguchi et al. | 382/167 |
| 2004/0085475 A1* | 5/2004 | Skow et al. | 348/362 |
| 2006/0061842 A1* | 3/2006 | Oka et al. | 358/522 |
| 2006/0066756 A1* | 3/2006 | Yamagishi et al. | 348/672 |
| 2006/0268180 A1* | 11/2006 | Chou | 348/673 |

FOREIGN PATENT DOCUMENTS

| | | |
|---|---|---|
| JP | 06-178153 | 6/1994 |
| JP | 2001-343957 A | 12/2001 |
| JP | 2004-007076 A | 1/2004 |
| JP | 2006-146178 A | 6/2006 |

\* cited by examiner

*Primary Examiner* — Victor Kostak

(74) *Attorney, Agent, or Firm* — Fitzpatrick, Cella, Harper & Scinto

(57) ABSTRACT

A data processing method of executing nonlinear conversion for pixel data, comprising: a first step of obtaining an amount of statistics corresponding to the number of pixel data having a gradation value in a predetermined range from a plurality of pixel data for displaying a predetermined image; a second step of obtaining a parameter corresponding to the distribution condition of the gradation values of the plurality of pixel data; an adjusting step of adjusting the amount of statistics based on the parameter; and a determining step of determining a conversion characteristic of the nonlinear conversion based on the adjusted amount of statistics.

12 Claims, 11 Drawing Sheets

FIG.6 i FRAME

FIG.7D i+1 FRAME

DATA PROCESSING METHOD AND DATA PROCESSING DEVICE FOR HISTOGRAM-BASED NONLINEAR CONVERSION

BACKGROUND OF THE INVENTION

The present invention relates to a data processing method, image processing method, image display apparatus and television apparatus.

Japanese Patent Application Laid-Open No. 06-178153 has disclosed a method of detecting a histogram and γ-converting it.

SUMMARY OF THE INVENTION

Figure 1:
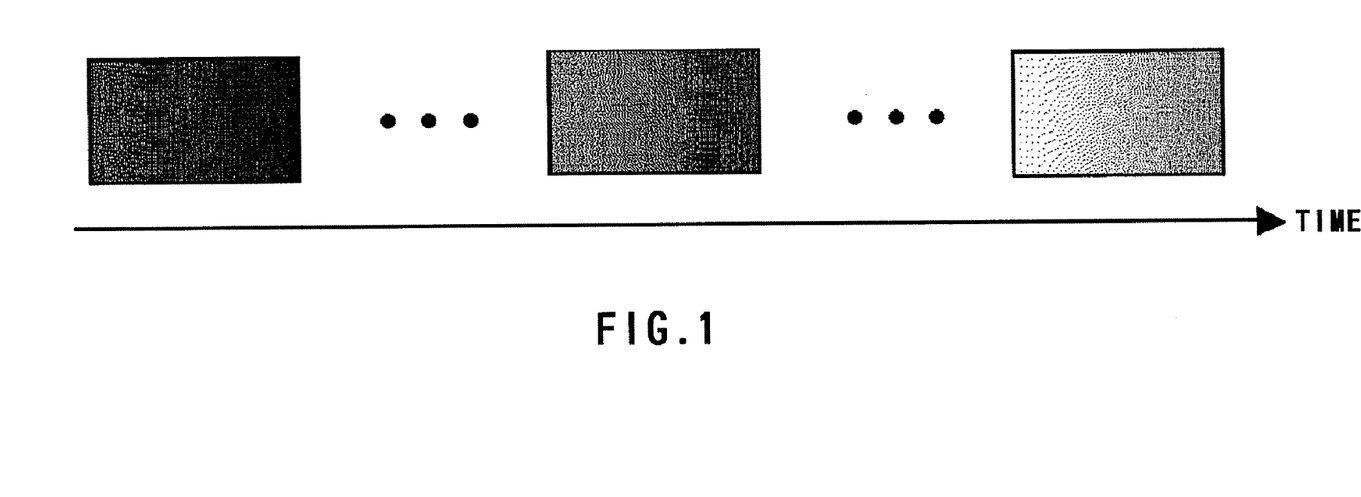
FIG. 1 is an example of inputted animation.

FIG. 1 shows changes of an inputted image. This image indicates an animation in which brightness of gradation increases monotonously with a time passage.

A case where in inputted image of FIG. 1 is processed based on the Japanese Patent Application Laid-Open No. 06-178153 will be described. FIG. 2 is a diagram for explaining a process of processing an image at i frame and in a image at i+1 frame of the inputted image of FIG. 1.

Figure 2A:
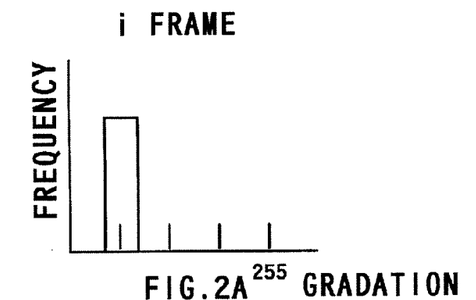
FIGS. 2A to 2H are examples of processing of the inputted image of FIG. 1 based on prior art method.

FIG. 2A shows a histogram of the image at i frame. This histogram indicates a result of counting an appearance frequency of image data about all 256 gradations. The image of i frame indicates a histogram in which all pixels are concentrated near the 64 gradations.

Figure 2B:
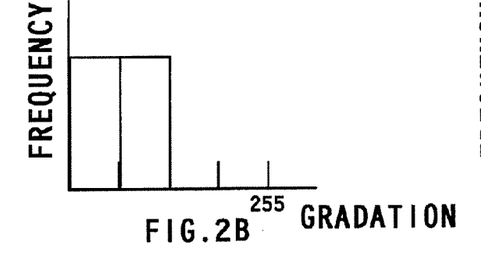

According to the prior art, all gradations are divided to four categories and a histogram is detected with binary system. That is, if a histogram of a certain category exceeds a reference value, the histogram of that category is regard as "H" and unless it exceed the reference value, the histogram of that category is regarded as "L". The histogram of the i frame detected by this method is a histogram in which only the category of 0 to 63 gradations and the category of 64 to 127 gradations exceed the reference value as shown in FIG. 2B. At this time, the γ-curve turns as shown in FIG. 2C.

Figure 2C:
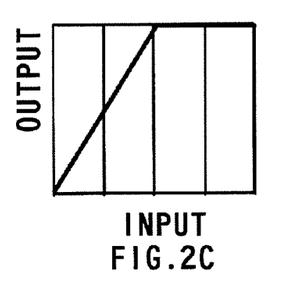
Figure 2D:
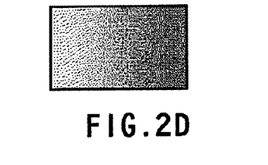

Because the image at i frame is converted by the γ curve as shown in FIG. 2C, the image is converted to an entirely bright image and displayed as shown in FIG. 2D.

Figure 2E:
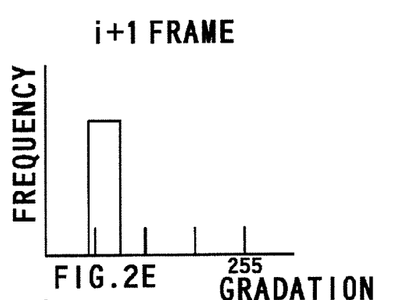
Figure 2F:
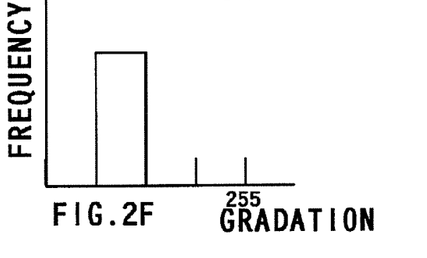

FIG. 2E shows a histogram of an image at i+1 frame. The image at i+1 is an image in which the brightness is increased slightly with respect to the image at i frame. The histogram detected by a method of the prior art turns as shown in FIG. 2F. That is, the category of 0 to 63 gradations is regarded as "L" because the histogram of this category does not satisfy the reference value and the category of 64 to 127 gradations is regarded as "H" because the histogram of that category exceeds the reference value. Thus, the γ curve turns as shown in FIG. 2C.

Figure 2G:
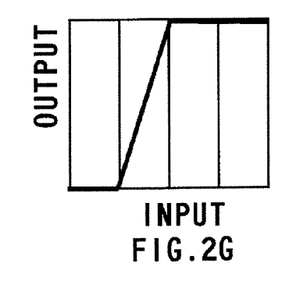
Figure 2H:
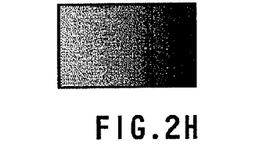

An image at i+1 frame is converted by γ curve as shown in FIG. 2G. Because the γ curve of FIG. 2G crushes a low gradation portion more than the γ curve of FIG. 2C, the image at i+1 frame turns to a darker image than shown in FIG. 2D and displayed as shown in FIG. 2H.

Although the inputted image in an image in which the brightness increases monotonously with a time passage. the brightness inverts when the category changes from i frame to i+1 frame if the γ conversion based on the prior art is carried out. Such brightness inversion deteriorates image quality because it is observed as blink of a screen.

Although the histogram values are classified to "H" and "L" by binary system according to the prior art, blink is left on the screen even if they are classified by multi-value. The reason is that when an image in which histograms are concentrated as shown in FIG. 1 changes in brightness in the gradation axis direction with a time passage, the shape of the gradation axis direction with a time passage, the shape of the histogram changes largely even if the brightness of an original image is changed slightly.

When the histogram concentrated highly move beyond the category, the shape of the histogram detected by dividing to a plurality of categories changes largely, If the shape of the histogram changes largely, the γ conversion characteristic changes largely, thereby generating blink on the screen.

An object of the present invention is to obtain image data in which blink on a screen is reduced when an animation is processed.

To achieve above-mentioned object, according to the present invention, a data processing method of executing nonlinear conversion for pixel data, comprises: a first step of obtaining an amount of statistics corresponding to the number of pixel data having a gradation value in a predetermined range from a plurality of pixel data for displaying a predetermined image; a second step of obtaining a parameter corresponding to the distribution condition of the gradation values of the plurality of pixel data; an adjusting step of adjusting the amount of statistics based on the parameter; and a determining step of determining the conversion characteristic of the nonlinear conversion based on the adjusted amount of statistics.

The image display apparatus of the invention includes a drive circuit for generating a modulation signal based on pixel data generated according to the data processing method further comprising a generating step of generating converted pixel data by applying the conversion characteristic determined by the determining step to pixel data for displaying the predetermined image on time axis and a display unit for displaying an image based on a modulation signal outputted from the drive circuit.

Further, a television apparatus of the present invention comprises: an image display apparatus according to claim 6; and a receiving circuit which receives a television signal and supplies image data to the image display apparatus.

The present invention provides an image processing method of executing γ conversion on an inputted image; comprising: a step of detecting a first amount of statistics for use in determining the γ curve on low gradation side and a second embodiment of statistics for use in determining the γ curve on high gradation side from the inputted image; a step of detecting a first distribution amount indicating a distribution condition in the vicinity of a gradation from which the first amount of statistics is detected and a second distribution amount indicating a distributed condition in the vicinity of a gradation from which the second amount of statistics is detected from the inputted image; a step of adjusting the first amount of statistics based on the first distribution amount and the second amount of statistics based on the second distribution amount; a step of determining the γ curve on the low gradation side based on the adjusted first amount of statistics and the γ curve on the high gradation side based on the adjusted second amount of statistics; and a step of determining the γ curve on all gradations by interpolating a half gradation between the γ curve on the low gradation side and the γ curve on the high gradation side.

DESCRIPTION OF THE EMBODIMENTS

Hereinafter, the preferred embodiments of the present invention will be described in detail with reference to the accompanying drawings. The scope of the present invention is not restricted to the dimension, material, shape and relative arrangement of components described in this embodiment unless otherwise specified. In all drawings of the embodiment, like reference numerals are attached to the same components or similar ones.

(Embodiment of Television Apparatus)

Figure 11:
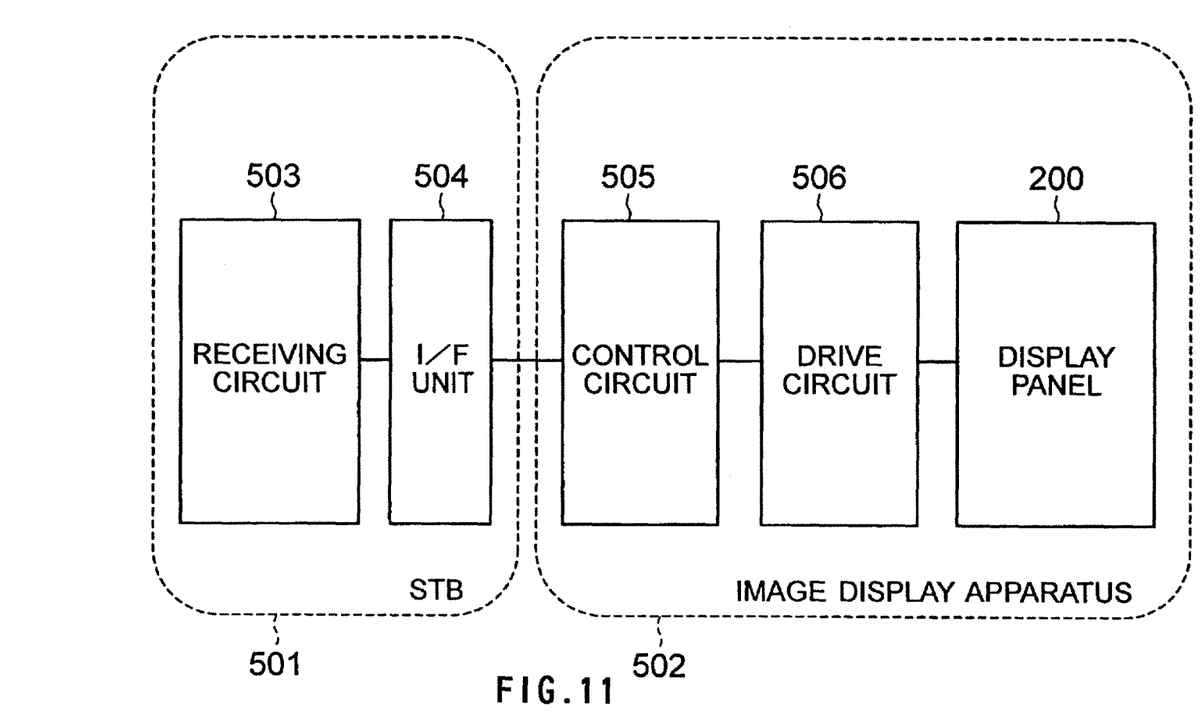
FIG. 11 is a block diagram of a television apparatus according to this embodiment.

The television apparatus which the present invention can be applied to will be described with reference to FIG. 11. FIG. 11 is a block diagram of the television apparatus comprises a set top box (STB) 501 and an image display apparatus 502.

The set top box (STB) 501 has a receiving circuit 503 and an I/F portion 504. The receiving circuit 503 is constituted of a tuner, decoder or the like, receiving a television signal such as satellite broadcasting, terrestrial broadcasting or data broadcasting via network and outputs decoded video data to the I/F portion 504. The I/F portion 504 converts vide data to display format of the image display apparatus 502 and outputs the image data to the image data apparatus 502.

Figure 10:
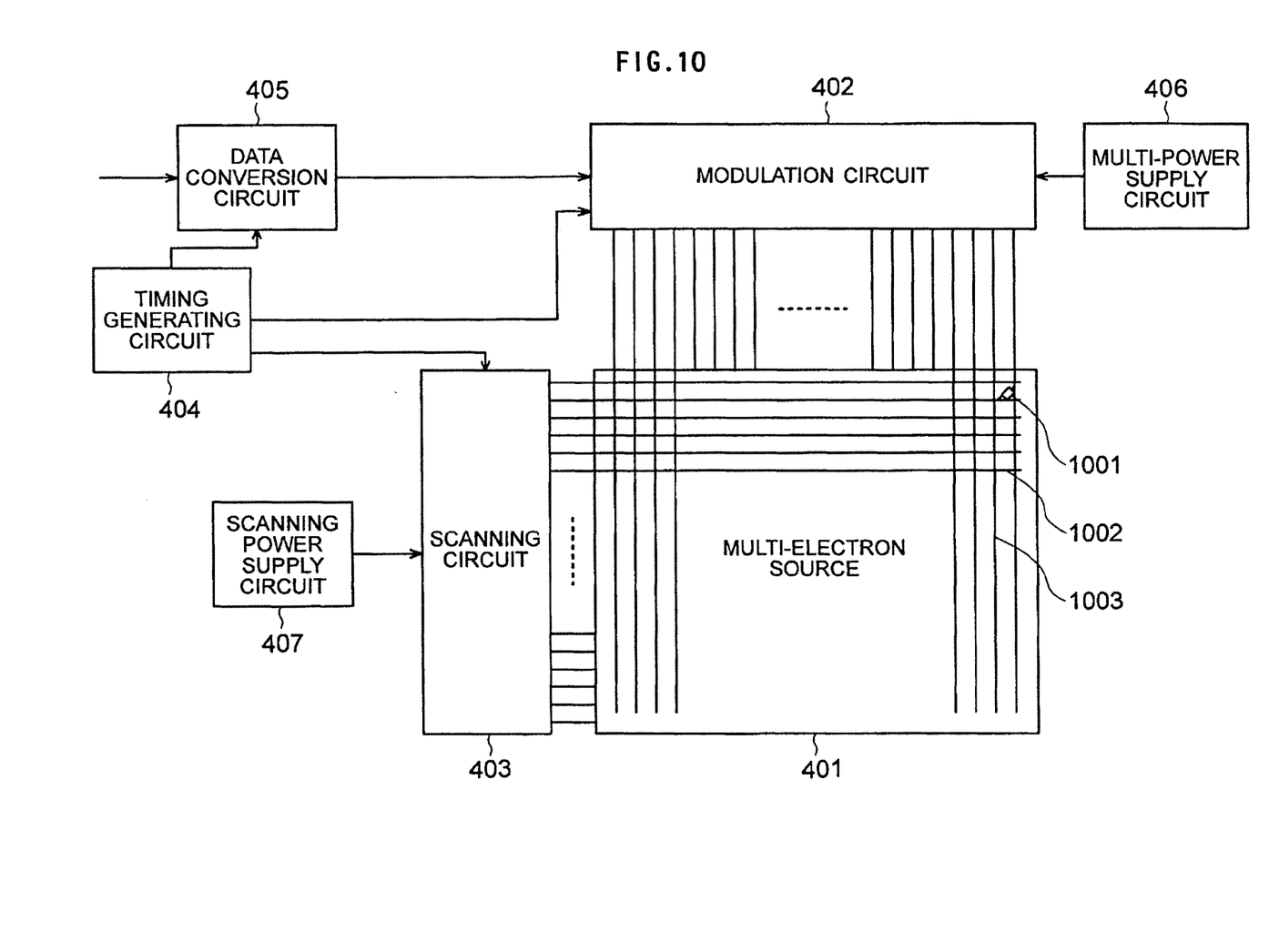
FIG. 10 is a block diagram of a drive circuit according to this embodiment.

The image display apparatus 502 comprises a display panel 200, a control circuit 505 and a drive circuit 506. The control circuit 505 contained in the image display apparatus 502 executes image processing such as correction processing suitable for the display panel 200 on inputted image data and outputs image data and a variety of control signals to the drive circuit 506. As an example of the control circuit 505, a timing generating circuit 404 in FIG. 10 can be mentioned. The drive circuit 506 outputs a drive signal on the display panel 200 based on the inputted image data and television picture is displayed on the display panel 200. As an example of the drive circuit 506, a modulating circuit 402 and a scanning circuit 40 in FIG. 10 can be mentioned. As the display panel 200, a multi-electronic source 401 as shown in FIG. 10 can be mentioned in following embodiments. As the multi-electronic source 401, a variety of display panels, for example, FED, PDP, LCD display, LED, EL display and the like can be used.

In the meantime, the receiving circuit 503 and the I/F portion 504 may be incorporated in a different casing from the image display apparatus 502 as the set top box (STB) 501 or may be incorporated in the same casing as the image display apparatus 502.

First, the drive circuit of the display unit according to the embodiment of the present invention will be described.

As a modulation method for modulation signal, pulse width modulation which modulates time width of a modulating signal or amplitude modulation which modulates the amplitude of a modulation signal can be applied. In case of simple pulse width modulation, the pulse width may be determined corresponding to gradation data (data indicating brightness to be displayed, for example, brightness data) with the amplitude of the modulation signal constant. In this case, gradation data may be inputted directly into the modulating circuit 402. In case of simple amplitude modulation, the amplitude may be determined corresponding to the gradation data with the pulse width of the modulation signal constant. In this case, the gradation data may be inputted directly into the modulating circuit 402.

The drive circuit of this embodiment which drives the multi electronic source 401 comprises the modulating circuit 402, the scanning circuit 403, the timing generating circuit 404, a data converting circuit 405, a multi power supply circuit 406 and a scanning power supply circuit 407 as shown in FIG. 10. This drive circuit constitutes part of the image display portion in the image display apparatus.

The multi electronic source 401 has a surface conduction type emitting device 1001 as a display device. Although as the display device, the surface conduction type emitting device is used here, a variety of devices such as spindt type emitting device, electro luminescence device can be used as the display device. In the meantime, if such a electron emitting device as the surface conduction type emitting device is used as the display device, light is generated when electron emitted from the electron emitting device is irradiated to fluorescence substance. As image is displayed by this light. Brightness of light can be controlled by the quantity of irradiation of electrons from an electron emitting device in a predetermined time. The quantity of irradiation of electrons from the electron emitting device can be controlled by the magnitude of voltage applied to the electron emitting device and time width. Thus, a desired quantity of irradiation can be obtained by controlling a difference of potential between the potential of the scanning signal and potential of the modulation signal or application time of the modulation signal is a period in which the scanning signal is applied.

The multi electron source 401 has a plurality of scanning wires 1002 for connecting a plurality of the display devices for matrix drive and a plurality of modulating wires 1003. The scanning signal is applied to this scanning lines 1002 and the modulation signal is applied to the modulating wire 1003.

The modulating circuit 402 is connected to the column direction wires which are modulating wires of the multi electron source 401. The modulating circuit 402 functions as a modulating means for giving a modulation signal modulated based on modulation data inputted from the data converting circuit 405 to the column direction wires which are connected to each of a plurality of electron sources.

The scanning circuit 403 is a circuit which is connected to the row direction wires of the multi electron source 401 for supplying a selection signal (scanning signal) to a scanning wire to which a display device driven by an output of the modulating circuit 402 is connected. Although generally, line sequential scanning of selecting each line in sequence is carried out, this embodiment is not restricted to this example, but jump scanning, selecting of a plurality of lines or selecting by a planar shape may be adopted. The scanning circuit 403 functions as a selecting means which selects lines by supplying a selection potential to the row direction wires to which a plurality of electron sources to be driven of a plurality of electron sources contained in the multi electron source 401 are connected in a predetermined time while providing a non-selecting potential at other time.

The timing generating circuit 404 is a circuit for generating the timing signal of the modulating circuit 402, the scanning circuit 403 and the data converting circuit 405.

The data converting circuit 405 is a circuit which executes data conversion of converting gradation data (brightness data) indicating a brightness demanded to the multi electron source 401 from outside into a drive waveform data format suitable for the modulating circuit 402.

<First Embodiment>

Figure 3:
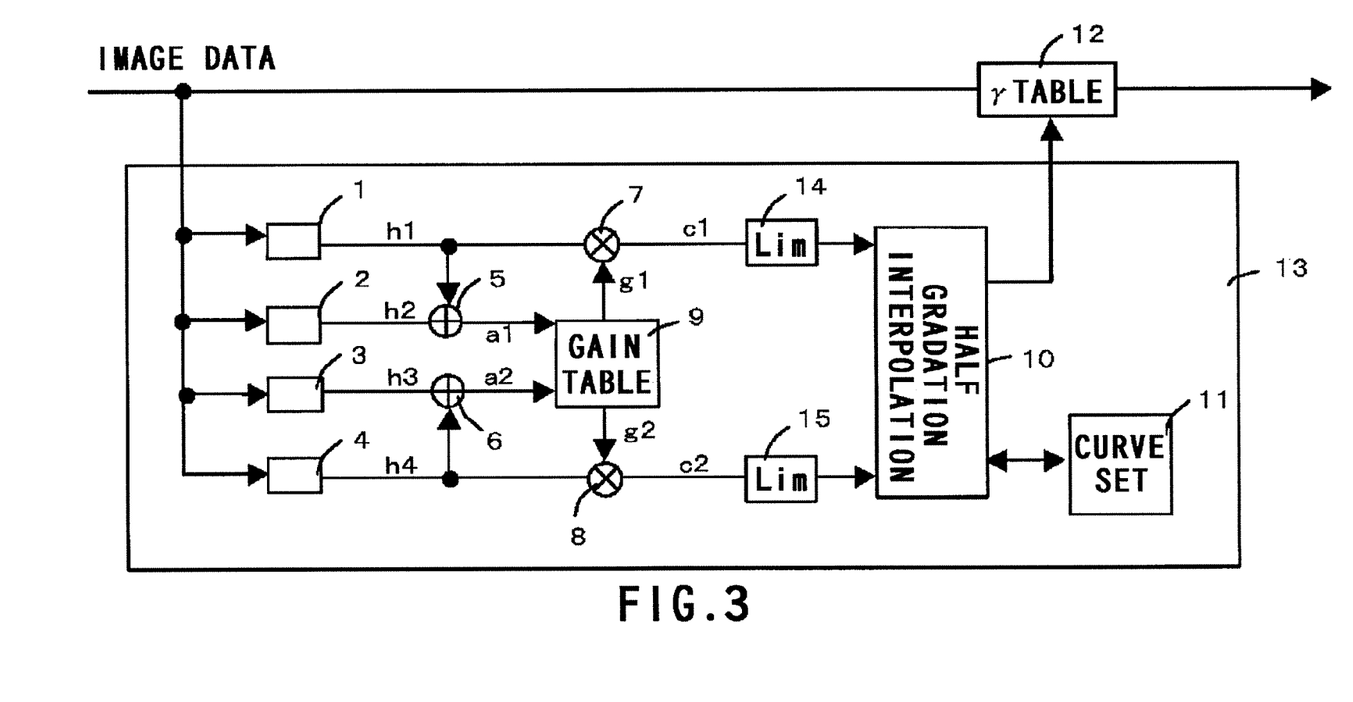
FIG. 3 is a circuit block diagram of a data converting circuit of the first embodiment.

FIG. 3 is a circuit block diagram of the data converting circuit 405 of this embodiment.

Inputted pixel data is converted nonlinearly (γ conversion) the γtable 12 and outputted. The γ table 12 is a RAM and the γ curve generating portion 13 rewrites γ curve in the γ table 12 for each frame. As a consequence, favorable γ conversion can be carried out corresponding to the inputted image. In the meantime, the pixel data is gradation data for specifying the gradation of pixel for forming an image. For example, inputted brightness data may be sued as this gradation data. Data gained by applying a variety of corrections on brightness data may be used as gradation data. If a single pixel is constituted of sub-pixels corresponding to a plurality of different colors (for example, R, G, B), data indicating the brightness of a pixel to be displayed with the a plurality of sub-pixels may be used as the pixel data mentioned here. Further, data which specifies the gradation of each sub-pixel may be used as the pixel data mentioned here. The conversion characteristic of the nonlinear conversion refers to the relation between an inputted value and an outputted value. That is, a condition for specifying an outputted value to the inputted value is the conversion characteristic. More specifically, a relation line expressed with the inputted value and outputted value set on the abscissa axis and ordinate axis respectively indicates the conversion characteristic. The γ curve corresponds to the conversion characteristic here.

In this embodiment, an example that with inputted pixel data having 8 bites (0 to 255 gradations), the appearance frequency of pixel data is counted by dividing the range of 0 to 255 of pixel data to four categories will be described. The reason is that if configuration of detecting each histogram of all gradations is adopted to execute the γ conversion by detecting the histogram, the structure of the circuit becomes tremendous. The detection of the histogram is executed for each image. If the quantity of pixels in the vertical direction is 1080 and the quantity of pixels in the horizontal direction is 1920, pixel data of 1080×1920 turns to an object of histogram detection of a single time. After a histogram of the amount corresponding to an image is detected, the detection result is reset. Subsequently, the histogram of an image subsequent to this image is detected.

A histogram counter 1 outputs a value "h1" corresponding to a histogram of 0 to 63 gradations. A histogram counter 2 outputs a value "h2" corresponding to a histogram of 64 to 127 gradations. A histogram counter 3 outputs a value "h3" corresponding to a histogram of 128 to 191 gradations. A histogram counter 4 outputs a value "h4" corresponding to a histogram of 192 to 255 gradations.

Figure 4:
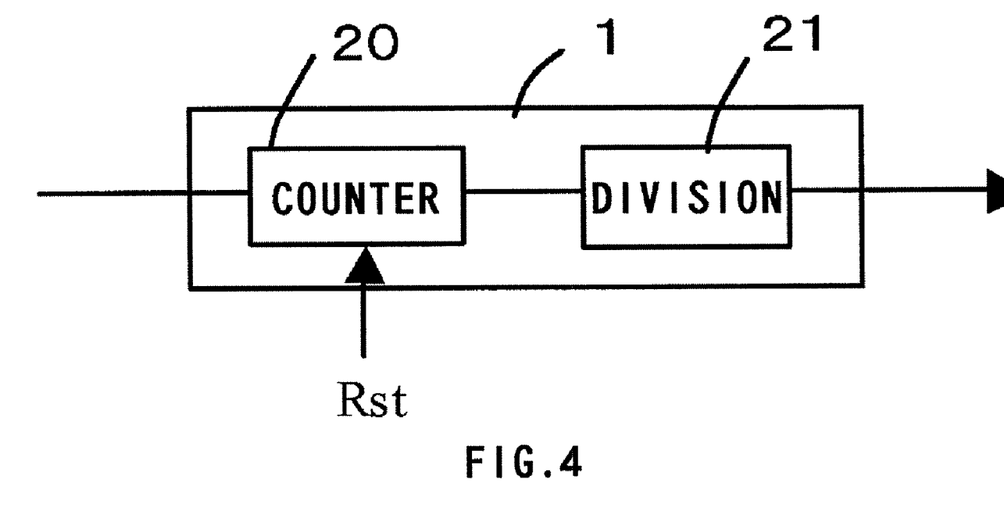
FIG. 4 is a detailed diagram of a counter.

FIG. 4 is a detailed diagram of the histogram counter 1.

When pixel data for specifying any gradation of the 0 to 63 gradations is inputted, the counter 20 increments the count value by "1". If counting of a frame is ended, a reset signal Rst is inputted to the counter 20 and its count value is outputted to a dividing portion 21 and then, the counter 20 is reset to 0.

The dividing portion 21 gradations the count value (histogram) outputted from the counter 20 to a value easy to process in a subsequent stage. More specifically, it is gradatind to a size corresponding to a number (No. 0 to 63) of a γ curve group in a curve set memory 11. This scaling is a processing of changing the count value which can be any value of all pixels (for example, 1080×1920=2073600) to a value easy to process. Therefore, this scaling does not correspond to adjustment which affects the conversion characteristic of the γ conversion. As a result of this scaling, the output "h1" of the histogram counter 1 turns to a value corresponding to the histogram of the 0 to 63 gradations. The processing in the curve set memory 11 will be described later.

Likewise, the histogram counter 2 outputs a value "h2" corresponding to the histogram of the 64 to 127 gradations, the histogram counter 3 outputs a value "h3" corresponding to the histogram of the gradation 128 to 191 and the histogram counter 4 outputs a value "h4" corresponding to the histogram of the 192 to 255 gradations.

An adder 5 sums the output "h1" of the histogram counter 1 with the output "h2" of the histogram counter 2 to output and additional value "a1" How the histograms are concentrated to the 0 to 127 gradations can be detected by the additional value "a1". That is, if the additional value "a1" is large, it is evident that the histograms are concentrated to the 0 to 127 gradations. In this embodiment, the additional value "a1" is used as a value which expresses the distribution condition of the histogram in the vicinity of the 0 to 63 gradations.

On the other hand, the adder 6 sums the output "h3" of the histogram counter 3 with the output "h4" of the histogram counter 4 to output an additional value "a2" The additional value "a2" is used as a value which expresses the distribution condition of histograms in the vicinity of the 192 to 255 gradations.

Figure 5:
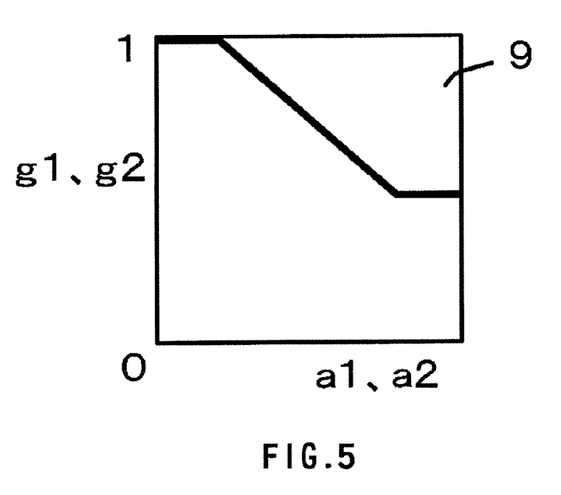
FIG. 5 is an example of a gain table.

A gain table 9 is a table which as the additional value "a1" and the additional value "a2" increase, outputs a smaller value (gain "g1", gain "g2"). The gain "g1" is an output to the additional value "a1" and the gain "g2" is an output to the additional value "a2". Although the gain is set to 0.5 to 1 in FIG. 5, this embodiment is not restricted to this example. FIG. 5 shows an example of the gain table 9. This gain "g1" and gain "g2" which are outputs of the gain table 9 are multiplied by "h1" and "h4" respectively by multipliers 7, 8. h1 or h4, which are the amounts of statistics obtained as a result of histogram detection are adjusted by gain which is a parameter (value indicating concentration of the histogram) corresponding to the distribution of the gradation value. In the meantime, timing for outputting the gains g1, g2 to the multipliers 7,8 may be controlled. The timing is controlled by providing a delay portion after the gain table 9 or the delay portion between the histogram counters 1, 4 and the multipliers 7, 8.

For example, in an image in which the histograms are concentrated in the vicinity of the 0 to 63 gradations (if the ratio of pixel data for specifying any gradation of the 0 to 63 gradations is relatively larger than a reference condition, an entirely dark image is produced), the additional value "a1" turns to a large value. On the other hand, the additional value "a2" turns to a small value because there are few histograms in the vicinity of 192 to 255 gradations. Therefore, the output "g1" of the gain table 9 corresponding to the additional value "a1" becomes "a value smaller than 1" and the output "g2" corresponding to the additional value "a2" turns to "1". "h1" is multiplied by the gain "g1" by the multiplier 7 and then turns to a reduced value "C1". "h2" is outputted from the multiplier 8 at "C2 (=h2)".

After the outputs C1, C2 of the multipliers 7, 8 pass limiters 14, 15 as a low gradation side curve member specifying value and a high gradation side curve number specifying value, they are inputted to a half gradation interpolating portion 10. The limiters 14, 15 limit the upper limit so that the C1, C2 do not exceed the quantity of curves stored in the curves set memory 11. Because this embodiment stores 65 curves (curve No.0 to 64) as the γ curves on the low gradation side and high gradation side, the limiters 15, 15 executes a processing of limiting to 64 or less if the values of C1, C2 exceed 64.

Figure 6:
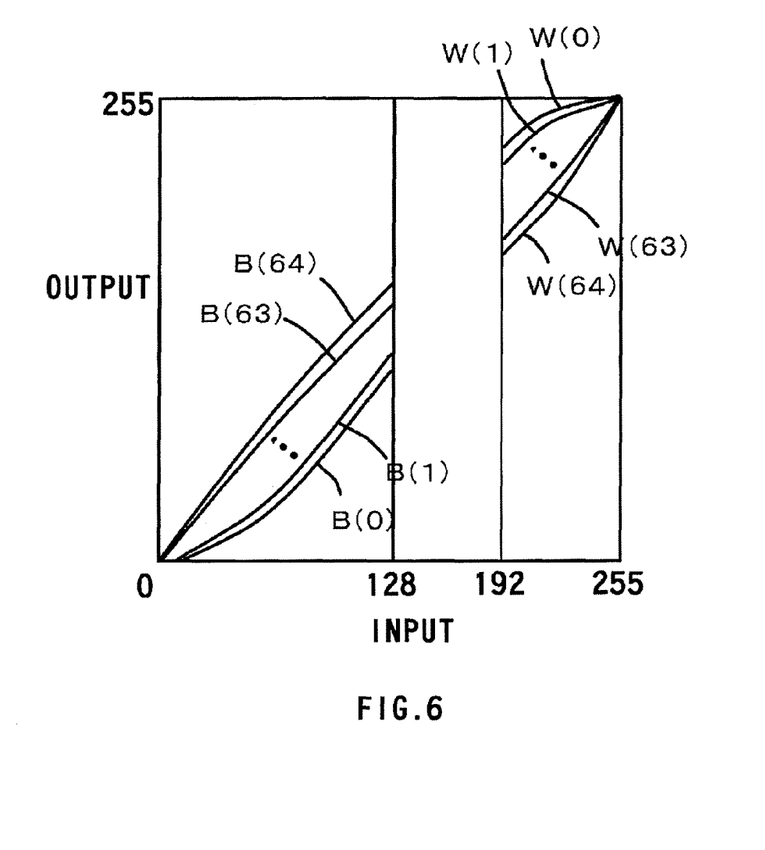
FIG. 6 is an example of curve set.

The curve set memory 11 stores a plurality of pieces of data set as each of the low gradation side γ curve and high gradation side γ curve. FIG. 6 is an example of the γ curve stored in the curve set memory 11. Outputs to inputs of the 0 to 128 gradations are specified as the γ curve group on the low gradation side and outputs to inputs of the 192 to 255 gradations are specified as the γ curve group on the high gradation side.

In this embodiment, it is assumed that 65 pieces (B0 to B64) of the γ curves are stored on the low gradation side and 65 pieces (W0 to W64) of the γ curves are stored on the high gradation side. The curve on the low gradation side depressed black as the subscript (i of B1) decreases. The curve on the high gradation side raises white as the subscript (i to Wi) decreases.

When a low gradation on side curve member C1 and a high gradation side curve number C2 are inputted, the half gradation interpolating portion 10 reads γ curve corresponding to C1, C2 from the curve set memory 11. In this embodiment, when the low gradation side curve number C1 is inputted, B (C1) γ curve is read in and when the high gradation side curve number C2 is inputted, W (C2) γ curve is read in. When any one of the low gradation side curve number C1 and the high gradation side curve number C2 is determined, the other may be automatically determined.

If the low gradation side γ curve an high gradation side γ curve are read in, next, the half gradation interpolating portion 10 obtains an input corresponding to inputs of 129 to 191 gradations as the half gradations by linear interpolation. As a consequence, outputs to all gradations of 0 to 255 are specified and its γ curve is written into the γ table 12.

The timing of writing into the γ table 12 is controlled by the half gradation interpolating portion 10 and the γ curve is written in the vertical retrace period. By controlling the timing, the γ curve can be applied to pixel data for forming an image whose histogram has been detected. However, because continuous images often have some degree of correlation, the γ curve determined by the histogram detected based on the pixel data for forming a previous image may be applied to pixel data for forming a certain image. Further, it is permissible to control the timing of applying the γ curve by providing with a delay circuit before the γ table 12.

The inputting image data is γ-converted by the γ table 12 and outputted.

Next, a specific processing of this embodiment will be described.

A case where the image as shown in FIG. 1 is inputted will be described. FIG. 7 shows a process for processing the i frame and i+1 frame of these images according to this embodiment.

Figure 7A:
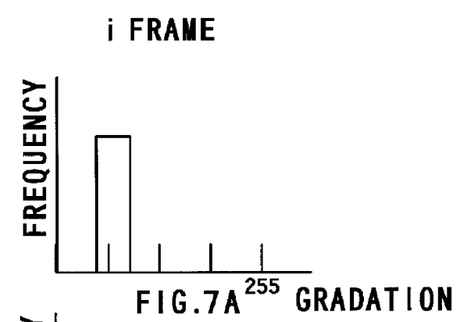
FIGS. 7A to 7H are examples of processing the inputted image of FIG. 1 based on the first embodiment.

First, a process of processing the i frame will be described. FIG. 7A shows a histogram of the i frame image. The histogram shown in FIG. 7A is a histogram in a case where the appearance frequency of pixel data is counted about all 256 gradations. The image at the i frame indicates that histogram in which all pixels are concentrated in the vicinity of the 64 gradations.

Figure 7B:
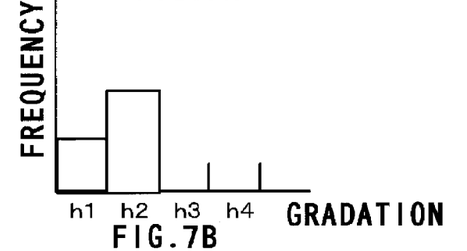

Values h1 to h4 corresponding to the histogram detected by the counters 1 to 4 are as shown in FIG. 7B. The histogram shown in FIG. 7B is comprised of our categories (ranges) in which each pixel data which constitutes pixel data group indicating the i frame can exist, indicating the frequency (appearance frequency) of pixel data contained in each category. Assume that h1 to h4 are of following values.

$$h1=60$$

$$h2=100$$

$$h3=0$$

$$h4=0 \quad \text{(equation 1)}$$

The additional values "a1", "a2" outputted from the adders 5, 6 are as follows.

$$a1=h1+h2=160 \quad \text{equation 2)}$$

$$a2=h3+h4=0 \quad \text{(equation 3)}$$

It is judged that histograms are concentrated to the low gradation side because the additional value "a1" is larger than the additional value "a2". Following gains "g1", "g2" are obtained by inputting the above additional values a1, a2 into the gain table shown in FIG. 5.

$$g1=0.05 \quad \text{(equation 4)}$$

$$g2=1 \quad \text{(equation 5)}$$

The gains g1, g2 are multiplied by h1 h4 by the multipliers 7, 8, so that the curve numbers "C1", "C2" turn as follows.

$$C1=h1 \times g1=30 \quad \text{(equation 6)}$$

$$C2=h4 \times g2=0 \quad \text{(equation 7)}$$

The curve number C1 on the low gradation side in which histograms are concentrated is dropped by the gain g1. As a consequence, the change of the curve number can be suppressed even if the brightness on the low gradation side in which the histograms are highly concentrated changes. That is, blink on the screen can be reduced without a large change of the shape of the detected histograms by dividing to a plurality of categories. On the other hand, because the high gradation side has few histograms, a possibility of generation of blink on the screen is low so that changes of the curve number does not need to be suppressed.

As a consequence, the half gradation interpolating portion 10 reads a γ curve of (B) 30 on the low gradation side and a γ curve of W (0) on the high gradation side from the curve set memory 11.

Figure 7C:
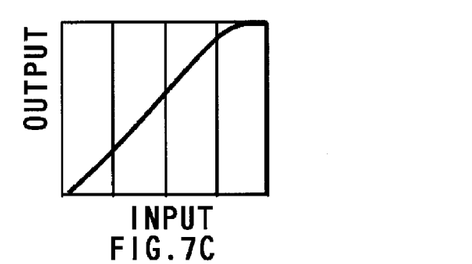
Figure 7D:
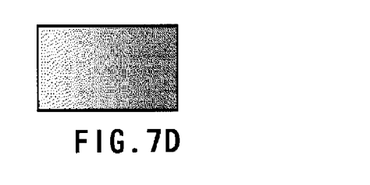

In the half gradation interpolating portion, 10 γ curve in FIG. 7C is obtained by interpolating output values to inputs of the 129 to 129 gradations and image conversion is executed according to this γ to obtain an image of FIG. 7D and display it.

Figure 7E:
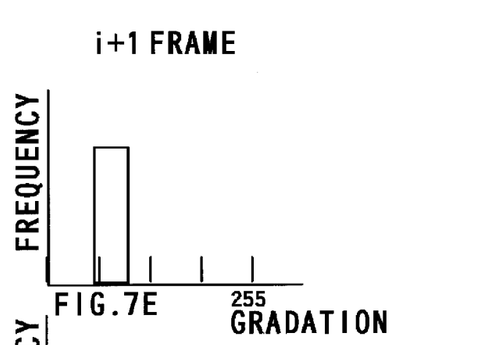
Figure 7F:
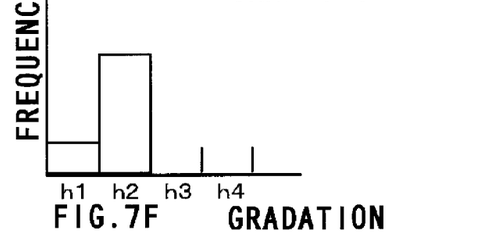

Next, a process of processing an image at i+1 frame will be described. FIG. 7E shows a histogram of an image at i+1 frame. Values h1 to h4 corresponding to the histogram turn as shown in FIG. 7F at this time. Values h1 to h4 are as follows.

$$h1=40$$

$$h2=120$$

$$h3=0$$

$$h4=0 \quad \text{(equation 8)}$$

The additional values "a1","a2" outputted from the adders 5, 6 are as follows.

$$a1=h1+2=160 \quad \text{(equation 9)}$$

$$a2h=3+h4=0 \quad \text{(equation 10)}$$

By inputting the above a1, a2 into the gain table of FIG. 5, following gains "g1", "g2" are obtained.

$$g1=0.5 \quad \text{(equation 11)}$$

$$g2=1 \quad \text{(equation 12)}$$

As a result of multiplying h1, h2 by gains g1, g2 by means of the multipliers 7, 8, the curve numbers "C1", "C2" are as follows.

$$C1 = h1 \, g \times 1 = 20 \quad \text{(equation 13)}$$

$$C2 = h4 \times g2 = 0 \quad \text{(equation 14)}$$

Figure 7G:
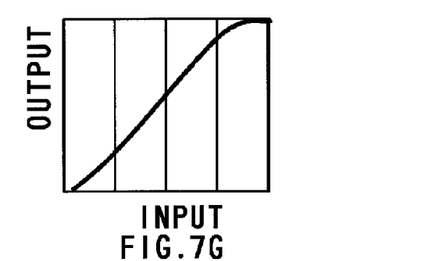
Figure 7H:
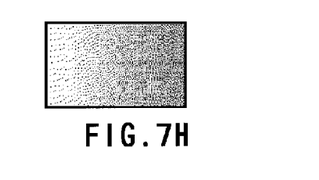

As a result, in the half gradation interpolating portion 10, the γ curve as shown in FIG. 7G is created to obtain an image as shown in FIG. 7H by conversion.

The curve number C1 on the low gradation side of the i frame is "30" as shown in the equation 6 and the curve member C1 on the i+1 frame is "20" as shown in the equation 13 and a difference of the curve number between the i frame and i+1 frame is "10". On the other hand, the h1 which is a curve number before gain g1 is multiplied is "60" at the i frame according to the equation 1 and the equation 8 and "40" at the i+1 frame and a difference therebetween is "20". That is, if the histograms are concentrated, the change amount of the curve number is dropped from "20" to "10" by multiplying gain 0.5, so that the change of the γ curve with a time passage is dulled. As a consequence, blink on the screen when an image whose histograms are concentrated changes in brightness can be reduced. In other words, when histograms highly concentrated move beyond a category, the blink on the screen can be reduced without a change of the shape of the histograms detected by dividing to a plurality of categories.

That is, in this embodiment, a value indicating the number of pixel data which specified a gradation in a certain gradation value range (category; 0 to 63 or 192 to 255 here) is obtained as a value of statistics for determining the conversion characteristic on nonlinear conversion. That obtained value is adjusted based on a value indicating the quantity of image data which specifies a range (0 to 127 or 128 to 255 here) which at least contains the gradation value range and is wider that gradation value range while narrower than the range of all gradations. The conversion characteristic of the nonlinear conversion is determined based on that adjusted value. As a consequence, any undesirable change in the conversion characteristic is suppressed.

<Second Embodiment>

Figure 8:
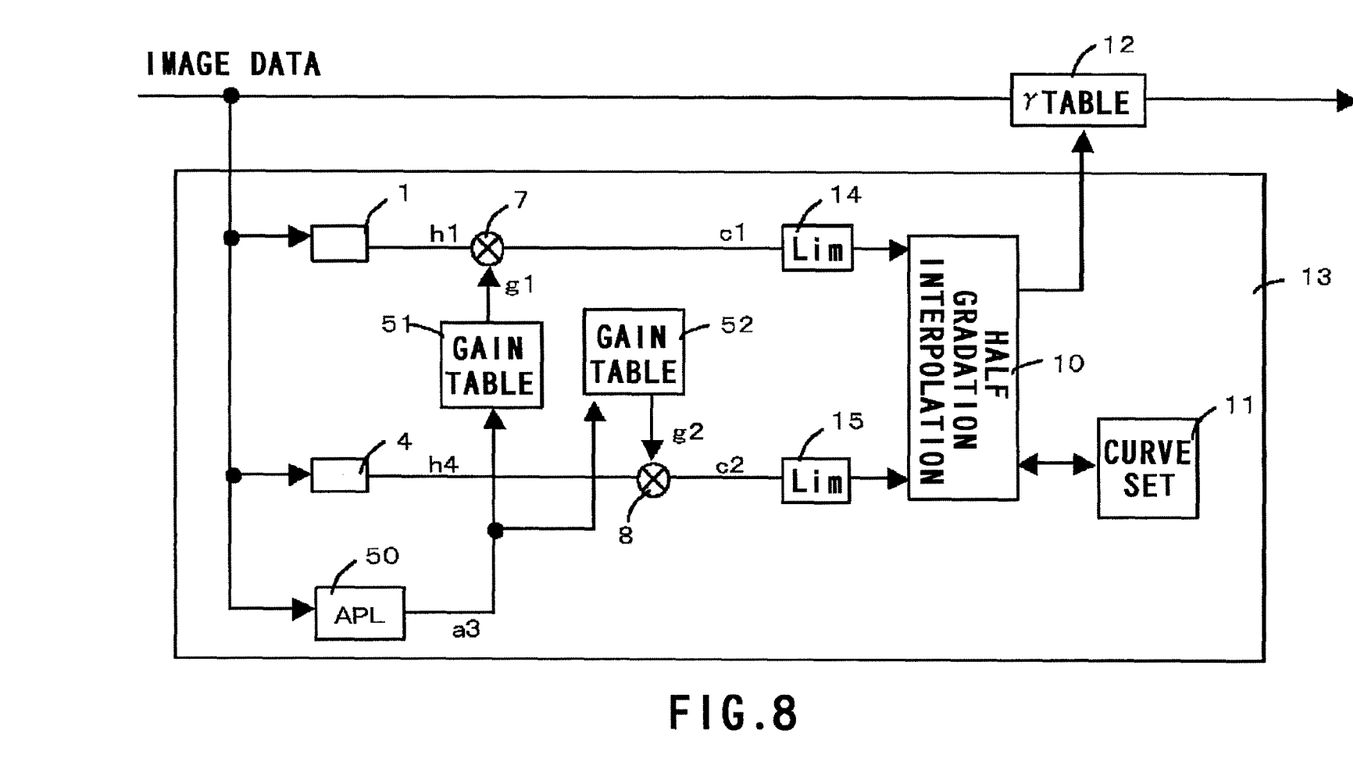
FIG. 8 is a circuit block diagram of a data converting circuit of the second embodiment.

FIG. 8 is a circuit block diagram of this embodiment. Like reference numerals are attached to blocks executing the same processing as in FIG. 3.

Values h1, h4 corresponding to histograms of 0 to 63 gradations and 192 to 255 gradations are counted by the histogram counters 1, 4.

According to this embodiment, an average picture level (APL) a3 of an image is detected by an APL detecting portion 50. In this embodiment, a3 is used as a value indicating the distribution condition. That is, it is judged that the histograms are concentrated more to the low gradation side as a3 is smaller and that the histograms are concentrated more to the high gradation side as a3 is larger. In the meantime, the APL value can be obtained as a sum of gradation values of a plurality of pixel data for forming an image. However, it is not always necessary, to obtain a strict sum because any because any value may be used long as it enables the brightness of an image to be evaluated. Output of the value which adjusts a result of the histogram detection based on a result of judgment on the histogram concentration according to the APT is carried out using a gain table described below. In the meantime, to obtain a value indicating the distribution condition, it is permissible to use dispersion of the gradation values of an image (pixel data).

Figure 9A:
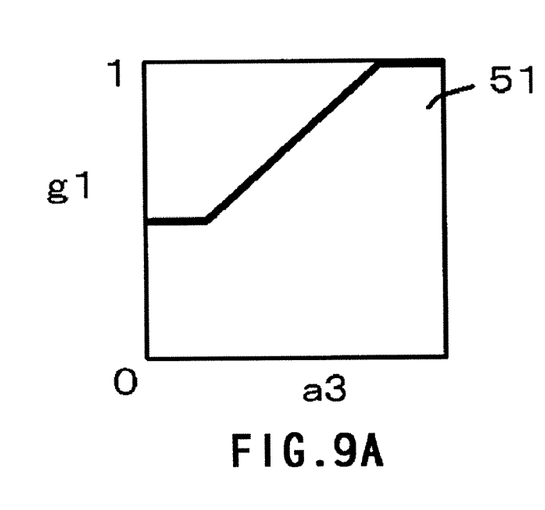
FIGS. 9A and 9B are examples of the gain table.
Figure 9B:
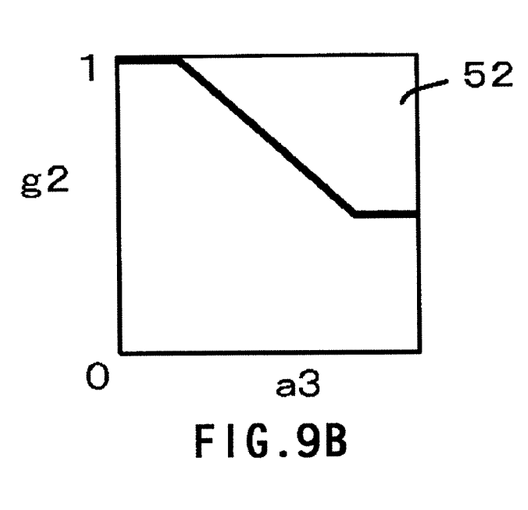

A gain table 51 is a table which stores gain on the low gradation side and a gain table 52 is a table which stores gains on the high gradation side. FIGS. 9A, and 9B show an example of the gain tables, 51, 52.

If APLa3 is low, the gain table 51 judges that the histograms are concentrated to the low gradation side and outputs a small gain g1. If the APLa3 is high, it judges that there are few histograms on the low gradation side and outputs a large gain g1.

If a3 is low, the gain table 52 judges that there are few histograms on the high gradation side and outputs a large gain g2. If a3 is high, it judges that the histograms are concentrated to the high gradation side and outputs a small gain g2.

The gains g1, g2 are multiplied by h1, h4 respectively by the multipliers 7, 8 like the first embodiment. The subsequent processes are same as the first embodiment.

As described above, blink on the screen can be reduced at the time of processing an animation like the first embodiment by determining the γ curve as a result of detecting histogram distribution conditions on the low gradation side and high gradation side based on the APL.

This application claims priority from Japanese Patent Application No. 2005-287774 filed Sep. 30, 2005, which is hereby incorporated by reference herein.

What is claimed is:

1. A data processing method of executing nonlinear conversion for image data which have a plurality of pixel data, comprising:

a first step of obtaining a second amount of statistics corresponding to the number of pixel data having a gradation value in a second range included in a predetermined first range based on gradation values of the plurality of pixel data of the image data;

a second step of obtaining a first amount of statistics corresponding to the number of pixel data having a gradation value in the first range;

an adjusting step of adjusting the second amount of statistics obtained in said first step using a first gain which is determined based on the first amount of statistics obtained in said second step such that the greater the first amount of statistics is, the smaller the second amount of statistics is;

a determining step of determining a conversion characteristic of the nonlinear conversion based on the second amount of statistics adjusted in said adjusting step; and a generating step of performing the nonlinear conversion to the image data using the conversion characteristic determined in said determining step to generate nonlinear-converted image data.

2. The data processing method according to claim 1, wherein said first step includes obtaining a fourth amount of statistics corresponding to the number of pixel data having a gradation value in a fourth range included in a predetermined third range which is different from the first range, said second step includes obtaining a third amount of statistics corresponding to the number of pixel data having a gradation value in the third range, said adjusting step includes adjusting the fourth amount of statistics obtained in said first step using a second gain which is determined based on the third statistics obtained in said second step such that the greater the third amount of statistics is, the smaller the fourth amount of statistics is, and said determining step includes determining the conversion characteristic of the nonlinear conversion based on the second amount of statistics and the fourth amount of statistics adjusted respectively in said adjusting step.

3. The data processing method according to claim 2, wherein the second range includes the lowest gradation value in the first range, and the fourth range includes the highest gradation value in the third range.

4. The data processing method according to claim 2, wherein said determining step includes selecting the conversion characteristic data corresponding to the second amount of statistics and the fourth amount of statistics adjusted respectively in said adjusting step from a plurality of predetermined conversion characteristic data to determine the conversion characteristic of the nonlinear conversion.

5. The data processing method according to claim 4, wherein said determining step includes determining the conversion characteristic of the nonlinear conversion for the pixel data having a gradation value in the first range based on the second amount of statistics adjusted in said adjusting step, and said determining step includes determining the conversion characteristic of the nonlinear conversion for the pixel data having a gradation value in the fourth range based on the fourth amount of statistics adjusted in said adjusting step.

6. A data processing method comprising:

an obtaining step of obtaining a first value corresponding to the number of pixel data having a value in a first range and a second value corresponding to the number of pixel data having a value in a second range included in the first range based on values of a plurality of pixel data which constitute image data;

a changing step of changing the second value obtained in said obtaining step based on the first value obtained in said obtaining step such that the greater the first value is, the smaller the second value is;

a determining step of determining a conversion characteristic of nonlinear conversion based on the second value changed in said changing step; and a processing step of performing the nonlinear conversion on the image data using the conversion characteristic determined in said determining step to generate nonlinear-converted image data.

7. The data processing method according to claim 6, wherein said obtaining step includes obtaining a third value corresponding to the number of pixel data having a value in a third range which is different from the first range and obtains a fourth value corresponding to the number of pixel data having a value in a fourth range included in the third range, said changing step includes changing the fourth value obtained in said obtaining step based on the third value obtained in said obtaining step such that the greater the third value is, the smaller the fourth value is, and said determining step includes determining the conversion characteristic of the nonlinear conversion based on the second value and the fourth value changed respectively in said changing step.

8. The data processing method according to claim 7, wherein the second range includes the lowest value in the first range, and the fourth range includes the highest value in the third range.

9. The data processing method according to claim 7, wherein the determining step includes selecting the conversion characteristic data corresponding to the second value and the fourth value changed in said changing step from a plurality of predetermined conversion characteristic data to determine the conversion characteristic of the nonlinear conversion.

10. The data processing method according to claim 9, wherein said determining step includes determining the conversion characteristic of the nonlinear conversion for the pixel data having a value in the first range based on the second value changed in said changing step, and said determining step includes determining the conversion characteristic of the nonlinear conversion for the pixel data having a value in the fourth range based on the fourth value changed in said changing step.

11. A data processing device for executing nonlinear conversion of pixel data comprising:

a first unit that obtains a second amount of statistics corresponding to the number of pixel data having a gradation value in a second range included in a predetermined first range based on gradation values of a plurality of pixel data which constitute image data;

a second unit that obtains a first amount of statistics corresponding to the number of pixel data having a gradation value in the first range;

an adjusting unit that adjusts the second amount of statistics obtained by said first unit using a first gain which is determined based on the first amount of statistics obtained by said second unit such that the greater the first amount of statistics is, the smaller the second amount of statistics is;

a determining unit that determines a conversion characteristic of the nonlinear conversion based on the second amount of statistics adjusted by said adjusting unit; and a generating unit that performs the nonlinear conversion on the image data using the conversion characteristic determined by said determining unit to generate nonlinear-converted image data.

12. A data processing device comprising:

an obtaining unit that obtains a first value corresponding to the number of pixel data having a value in a first range and a second value corresponding to the number of pixel data having a value in a second range included in the first range based on values of a plurality of pixel data which constitute image data;

a changing unit that changes the second value obtained by said obtaining unit based on the first value obtained by said obtaining unit such that the greater the first value is, the smaller the second value is;

a determining unit that determines a conversion characteristic of nonlinear conversion based on the second value changed by said changing unit; and a processing unit that performs the nonlinear conversion on the image data using the conversion characteristic determined by said determining unit to generate nonlinear-converted image data.

* * * * *